United States Patent [19]
Fulda

[11] Patent Number: 5,892,433
[45] Date of Patent: Apr. 6, 1999

[54] TIMING CIRCUIT FOR AIR BAG DISABLE SWITCH

[75] Inventor: Peter A. Fulda, Wixom, Mich.

[73] Assignee: TRW Inc., Lyndhurst, Ohio

[21] Appl. No.: 892,876

[22] Filed: Jul. 15, 1997

[51] Int. Cl.[6] .................................................. B60Q 1/00
[52] U.S. Cl. .......................... 340/438; 340/436; 280/735; 180/282
[58] Field of Search .................................... 340/438, 435, 340/436, 425.5, 426; 280/734, 735, 732; 180/273, 282; 307/10.1

[56] References Cited

U.S. PATENT DOCUMENTS

| | | | |
|---|---|---|---|
| 5,014,038 | 5/1991 | Leigh-Monstevens et al. | 340/430 |
| 5,234,228 | 8/1993 | Morota et al. | 280/734 |
| 5,438,237 | 8/1995 | Mullins et al. | 315/82 |
| 5,455,716 | 10/1995 | Suman et al. | 359/838 |
| 5,528,698 | 6/1996 | Kamei et al. | 280/735 |
| 5,544,914 | 8/1996 | Borninski et al. | 280/735 |
| 5,570,903 | 11/1996 | Meister et al. | 340/438 |
| 5,683,103 | 11/1997 | Blackburn et al. | 340/438 |

Primary Examiner—Thomas J. Mullen, Jr.
Assistant Examiner—Van T. Trieu
Attorney, Agent, or Firm—Tarolli, Sundheim, Covell, Tummino & Szabo

[57] ABSTRACT

A vehicle occupant safety apparatus (10) includes an inflatable vehicle occupant protection device (22) and an inflator (20) actuatable in response to sensing a condition indicative of a vehicle collision. A disable switch (40) has a first condition enabling actuation of the inflator (20) and a second condition disabling actuation of the inflator. An electrically energizable indicator (50), when energized, indicates that the disable switch (40) is in the second condition. The indicator (50) is energized when the ignition (58) of the vehicle is on and the disable switch (40) is in the second condition. The indicator (50) is also energized for a predetermined period of time, when the vehicle ignition (58) is off, in response to movement of the disable switch (40) from the first condition to the second condition. The indicator (50) is also energized in response to a vehicle event (70), for a predetermined period of time, when the vehicle ignition (58) is off and the disable switch (40) is in the second condition.

16 Claims, 1 Drawing Sheet

TIMING CIRCUIT FOR AIR BAG DISABLE SWITCH

BACKGROUND OF THE INVENTION

1. Technical Field

The present invention relates to a vehicle safety apparatus including an inflatable vehicle occupant protection device, such as an air bag. In particular, the present invention relates to a timing circuit for enabling operation of an air bag disable switch and an associated indicator when the vehicle ignition is off.

1. Description of the Prior Art

It is known to inflate an air bag to help protect a front seat passenger of a vehicle in the event of a vehicle collision. The air bag is stored in a deflated condition, together with an inflator, in the instrument panel of the vehicle. In the event of a vehicle collision, the inflator is actuated, and the air bag is inflated into a position between the front seat passenger and the instrument panel of the vehicle.

It is sometimes desirable that a passenger side air bag not be inflated in the event of a vehicle collision, for example, if a rearward facing child seat is disposed on the vehicle seat. It is known to provide a disable switch on the instrument panel of the vehicle, into which the vehicle ignition key can be inserted and turned in order to disable actuation of the inflator for the passenger side air bag. The disable switch is electrically connected with an indicator, such as a warning lamp, which indicates that the switch is in the "disabled" condition and that actuation of the inflator is not enabled.

If the indicator is connected at all times to the vehicle battery, then the indicator can alert a vehicle occupant, even when the vehicle ignition is off, that the switch is in the "disabled" condition. In this case, however, the indicator can, undesirably, drain the vehicle battery if the vehicle is not run for an extended period of time.

If the indicator is not connected at all times to the vehicle battery, then the indicator is not energized if the switch is in the "disabled" condition when the occupant enters the vehicle. In this case, the occupant does not know whether actuation of the air bag is enabled, until the vehicle ignition is turned on. Also, the indicator is not energized if the vehicle occupant moves the switch to the "disabled" condition upon entering the vehicle and prior to turning on the vehicle ignition. In either case, the vehicle ignition may have to be turned off and the ignition key removed in order to move the disable switch to the desired position.

SUMMARY OF THE INVENTION

The present invention is a vehicle occupant safety apparatus comprising an inflatable vehicle occupant protection device and an inflator actuatable to inflate the inflatable device in response to sensing a condition indicative of a vehicle collision. The apparatus includes a disable switch having a first condition enabling actuation of the inflator and a second condition disabling actuation of the inflator. The apparatus also includes an electrically energizable indicator for, when energized, indicating that the disable switch is in the second condition. The apparatus further includes means for energizing the indicator when the ignition of the vehicle is on and the disable switch is in the second condition. The apparatus also includes means for energizing the indicator for a predetermined period of time when the vehicle ignition is off in response to movement of the disable switch from the first condition to the second condition. The indicator is also energized in response to a vehicle event, for a predetermined period of time, when the vehicle ignition is off and the disable switch is in the second condition.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
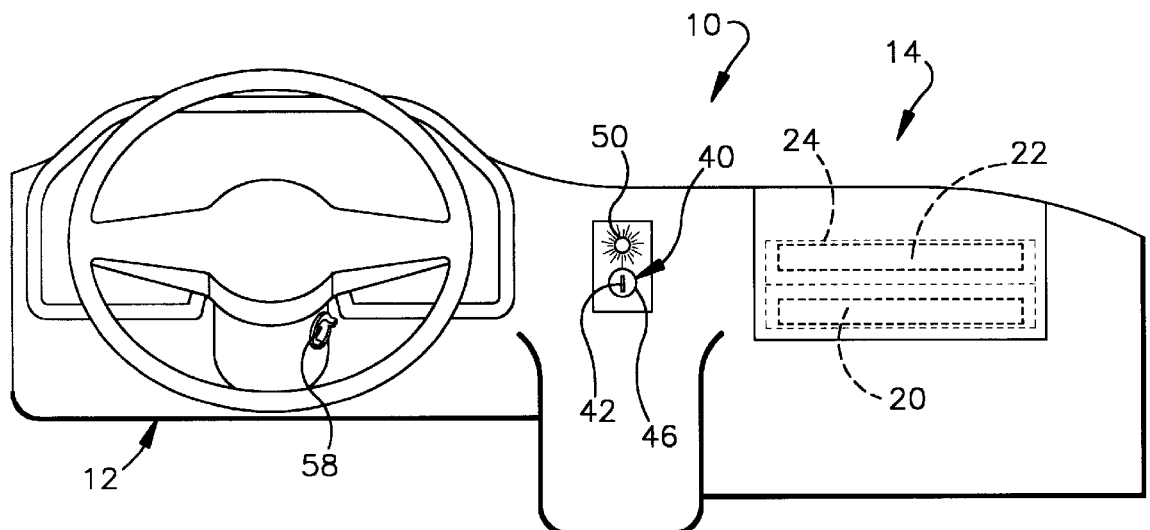
FIG. 1 is a schematic view illustrating a portion of a vehicle instrument panel and showing a vehicle safety apparatus constructed in accordance with the present invention.

The present invention relates to a vehicle safety apparatus including an inflatable vehicle occupant protection device, such as an air bag. In particular, the present invention relates to a vehicle safety apparatus including a timing circuit for enabling operation of an air bag disable switch and an associated indicator when the vehicle ignition is off. As representative of the present invention, FIG. 1 illustrates schematically a vehicle safety apparatus 10 constructed in accordance with the present invention.

Figure 2:
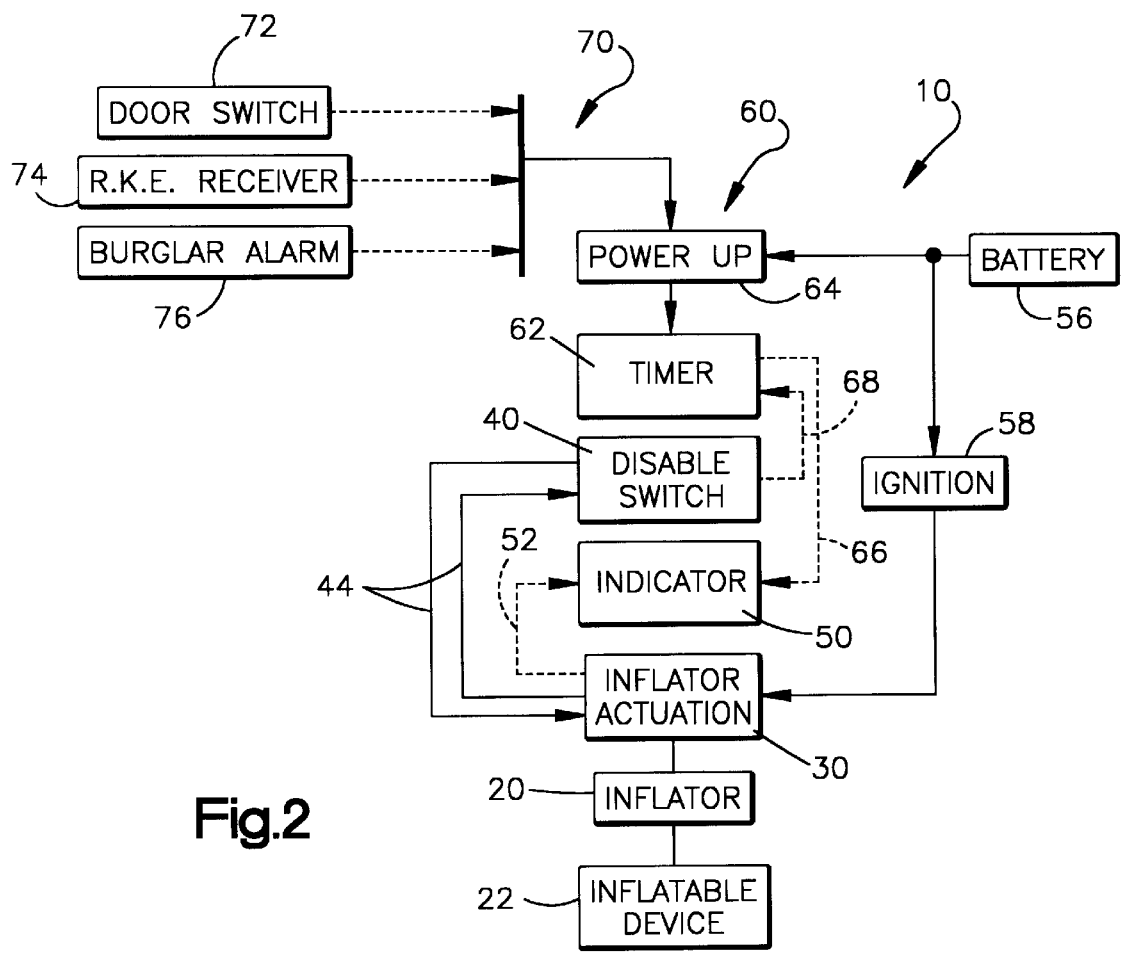
FIG. 2 is a block diagram of the vehicle safety apparatus of FIG. 1.

The safety apparatus 10 is mounted in an instrument panel 12 of a vehicle 14. The safety apparatus 10 includes an inflatable device 20, such as an air bag, mounted together with an electrically actuatable inflator 22 as part of an air bag module 24. Actuation of the inflator 22 is controlled by vehicle electric circuitry indicated schematically at 30 (FIG. 2) which may be mounted in the instrument panel 12 of the vehicle 14 or elsewhere in the vehicle.

The vehicle electric circuitry 30 includes an electronic control module which preferably includes a microprocessor. The vehicle electric circuitry 30 also includes known sensor means for sensing a condition indicative of a collision involving the vehicle 14 and for causing the electronic control module to actuate the inflator 22 in response. The air bag 20 is inflatable into a position between the occupant of the front passenger seat of the vehicle 14 and the instrument panel 12 of the vehicle to help protect the occupant.

A disable switch 40 is mounted on the instrument panel 12 of the vehicle 14 so that the disable switch is manually actuatable by an occupant of the vehicle, such as the driver. The disable switch 40 is a known switch of the type having a keyway 42 adapted to receive the ignition key of the vehicle 14. The disable switch 40 is electrically connected by wiring indicated schematically at 44 (FIG. 2) with the inflator actuation circuitry 30. The inflator actuation circuitry 30 continuously checks the status of the disable switch 40, via the wiring 44, whenever there is power to the circuitry 30.

The keyway 42 of the disable switch 40 is in a lock cylinder 46 which is rotatable, upon insertion of the ignition key, between first and second positions. When the lock cylinder 46 of the disable switch 40 is in the first position, the disable switch is in a first or "enabled" condition enabling actuation of the inflator 22 by the inflator actuation circuitry 30. When the lock cylinder 46 of the disable switch 40 is in the second position, the disable switch is in a second or "disabled" condition disabling actuation of the inflator 22 by the inflator actuation circuitry 30.

The safety apparatus 10 also includes an electrically energizable indicator 50. The indicator 50 indicates the condition of the disable switch 40. Specifically, the indicator 50 is electrically energized, in a manner described below, when the disable switch 40 is in the second condition disabling actuation of the inflator 22. The indicator 50 is not energized when the disable switch 40 is in the first condition enabling actuation of the inflator 22. The indicator 50 is preferably a lamp which, when energized, may be steadily illuminated or may blink. The indicator 50 may, alternatively, be a chime or other type of device suitable to alert an occupant of the vehicle 14 that actuation of the inflator 22 is disabled.

The indicator 50 is normally supplied with electric current by the vehicle battery 56 (FIG. 2) through the ignition 58 of the vehicle 14. When the vehicle ignition 58 is first turned on by use of the ignition key, electric current is supplied to the inflator actuation circuitry 30. The inflator actuation circuitry 30 continuously checks the status of the disable switch 40 via the wiring 44. If the disable switch 40 is in the first or "enabled" condition when the ignition 58 is turned on, then the indicator 50 is not energized. If the disable switch 40 is in the second or "disabled" condition when the ignition 58 is turned on, then the indicator 50 is electrically energized via wiring 52. If the indicator 50 is a lamp, for example, the lamp is illuminated to alert occupants of the vehicle 14 that the air bag 20 is not inflatable in the event of a vehicle collision.

The safety apparatus 10 includes a timing circuit 60 (FIG. 2) for enabling energization of the indicator 50 when the vehicle ignition 58 is off. The timing circuit 60 includes a timer indicated schematically at 62. The timer 62 is a known device or circuit, preferably on a semiconductor chip, for enabling flow of electric current to the indicator 50, via wiring 66, for a predetermined period of time. The predetermined period of time is selected to be a period of time which is long enough to enable the driver of the vehicle 14 to enter the vehicle, manually operate the disable switch 40 (if desired), and turn on the vehicle ignition 58. The predetermined period of time may be, for example, a period of one minute. The timer 62 is also electrically connected with the disable switch 40 by wiring 68, so that the condition of the disable switch can, as described below, control the flow of electric current from the timer to the indicator 50. The timer 62 may be formed as a part of the inflator actuation circuitry 30.

The timing circuit 60 also includes power-up circuitry indicated schematically at 64. The power-up circuitry 64 receives electric current directly from the vehicle battery 56 when the vehicle ignition 58 is off. The power-up circuitry 64 comprises known electric circuitry for enabling flow of electric current from the vehicle battery 56 to the timer 62 and thereby to the indicator 50 when the vehicle ignition 58 is off.

The timing circuit 60 including the power-up circuitry 64 is actuated by a vehicle event or actuating event indicated schematically at 70. The actuating event 70 may be any one of several different occurrences. For example, the actuating event 70 may be the opening of a door of the vehicle 14, as sensed by a door switch 72. In this case, the opening of the door causes a change in the state of the door switch 72, which change causes the timing circuit 60 to be electrically energized.

As another example, the actuating event 70 may be the actuation of the receiver portion 74 of a remote keyless entry system of the vehicle 14. In this case, the reception of a transmitted opening code by the receiver 74, resulting in the unlocking of a door of the vehicle 14, causes the timing circuit 60 to be electrically energized.

As a further example, the actuating event 70 may be the disabling of a burglar alarm system 76 of the vehicle 14. In this case, the reception of a transmitted alarm disabling code for the system 76, resulting in the disabling of the alarm system, causes the timing circuit 60 to be electrically energized.

Upon the occurrence of an actuating event 70, the power-up circuitry 64 enables the flow of electric current from the vehicle battery 56 to the timer 62. The timer 62 is turned on so as to enable the flow of electric current via the wiring 66 from the vehicle battery 56 to the indicator 50. The indicator 50 is then functional in the same manner as when it is energized by electric current through the vehicle ignition 58—but only for the predetermined period of time set by the timer 62, as described below.

At the moment when the timer 62 is thus turned on by the actuating event 70, the disable switch 40 can be in one of two possible conditions. Specifically, the disable switch 40 can be in either the "enabled" condition (enabling actuation of the inflator 22) or the "disabled" condition (not enabling actuation of the inflator).

In the first case, that is, if the disable switch 40 is in the "enabled" condition at the moment when an actuating event 70 occurs, the condition of the disable switch blocks flow of current from the timer 62 through the wiring 66 to the indicator 50. The indicator 50 is not turned on, that is, is not electrically energized. The indicator 50 remains off for the entire predetermined time period.

If the disable switch 40 is in the "enabled" condition at the moment when an actuating event 70 occurs, and the vehicle occupant, during this predetermined time period, thereafter changes the condition of the disable switch 40 from "enabled" to "disabled", then the disable switch disables the inflator 22 from actuation. The change in condition of the disable switch 40 also allows current to flow from the timer 62 through the wiring 66 to the indicator 50. The indicator 50 is electrically energized for the duration of the predetermined time period. Because the indicator 50 is energized, the vehicle occupant is made aware of the fact that actuation of the inflator 22 has been successfully disabled even though the vehicle ignition 58 is off. This indication persists for the predetermined time period, which is selected to be long enough to enable the driver of the vehicle 14 thereafter to turn on the vehicle ignition 58.

If, during this predetermined time period, the vehicle ignition 58 is turned on, current continues to be supplied to the indicator 50 through the ignition and the inflator actuation circuitry 30, while the power supply to the timer 62 is cut off. If, on the other hand, the occupant does not turn on the vehicle ignition 58 within the predetermined time period and after changing the condition of the disable switch 40 to "disabled", then the timer 62 automatically cuts off the flow of current to the indicator 50. The indicator 50 is turned off.

The second set of circumstances arises when the disable switch 40 is in the "disabled" condition at the moment when an actuating event 70 occurs. In this second case, the condition of the disable switch 40 allows current to flow from the battery 56, through the power up circuitry 64, the timer 62, and the wiring 66, to the indicator 50. The indicator 50 is turned on (electrically energized) for the duration of the predetermined time period. This time period is selected to be long enough to enable the driver of the vehicle 14 to turn on the vehicle ignition 58 thereby to continue normal energization of the indicator 50. This time period begins with the occurrence of the actuating event 70.

If the occupant, during this predetermined time period, changes the condition of the disable switch 40 from "disabled" to "enabled", then the changed condition of the disable switch blocks the flow of current from the timer 62 to the indicator 50, and the indicator is turned off. Also, the condition of the disable switch 40 now enables actuation of the inflator 22. If the occupant does not thereafter turn on the vehicle ignition 58 within the predetermined time period, then the timer 62 automatically cuts off flow of current to the indicator 50, and the indicator is turned off.

Because in this second case the indicator 50 is energized immediately upon occurrence of the actuating event 70, the vehicle occupant is alerted to the "disabled" condition of the inflator 22 when the occupant enters the vehicle 14, even though the vehicle ignition 58 is off. Since the indicator 50 is not permanently connected to the vehicle battery 56, however, the indicator can not drain the vehicle battery if the vehicle 14 is not turned on for an extended period of time.

From the above description of the invention, those skilled in the art will perceive improvements, changes and modifications in the invention. Such improvements, changes and modifications within the skill of the art are intended to be covered by the appended claims.

Having described the invention, I claim:

1. A vehicle occupant safety apparatus comprising:
   an inflatable vehicle occupant protection device;
   an inflator electrically actuatable to inflate said inflatable device in response to sensing a condition indicative of a vehicle collision;
   a disable switch spaced apart from and separate from the vehicle ignition switch and having a first condition enabling actuation of said inflator and a second condition disabling actuation of said inflator;
   an electrically energizable indicator for, when energized, indicating that said disable switch is in the second condition;
   means for energizing said indicator when the vehicle ignition switch is on and said disable switch is in the second condition; and
   means for energizing said indicator for a predetermined period of time when the vehicle ignition switch is off in response to movement of said disable switch from the first condition to the second condition when the vehicle ignition switch is off.

2. An apparatus as set forth in claim 1 wherein said means for energizing comprises a timer electrically connected between a vehicle power source and said indicator for supplying electric current to said indicator for the predetermined period of time when the vehicle ignition is off.

3. An apparatus as set forth in claim 2 wherein said means for energizing comprises means responsive to a vehicle event for supplying electric current to said timer.

4. An apparatus as set forth in claim 3 wherein said means responsive to a vehicle event comprises power-up circuitry for enabling flow of electric current from the vehicle power source to said timer, thereby to enable flow of electric current from the vehicle power source to said indicator for the predetermined period of time as determined by said timer.

5. An apparatus as set forth in claim 3 wherein said means responsive to a vehicle event comprises a door switch of the vehicle.

6. An apparatus as set forth in claim 3 wherein said means responsive to a vehicle event comprises a remote keyless entry receiver of the vehicle.

7. An apparatus as set forth in claim 3 wherein said means responsive to a vehicle event comprises a burglar alarm system of the vehicle.

8. An apparatus as set forth in claim 1 wherein the predetermined period of time is selected to be long enough to enable a driver of the vehicle to enter the vehicle and to operate the disable switch and to turn on the vehicle ignition.

9. A vehicle occupant safety apparatus comprising:
   an inflatable vehicle occupant protection device;
   an inflator electrically actuatable to inflate said inflatable device in response to sensing a condition indicative of a vehicle collision;
   a disable switch located inside the vehicle and separate and apart from the vehicle ignition switch, said disable switch being manually actuatable and having a first condition enabling actuation of said inflator and a second condition disabling actuation of said inflator;
   an electrically energizable indicator for, when energized, indicating that said disable switch is in the second condition;
   means for energizing said indicator when the vehicle ignition switch is on and said disable switch is in the second condition; and
   means responsive to a vehicle event for energizing said indicator for a predetermined period of time when the vehicle ignition switch is off and said disable switch is in the second condition.

10. An apparatus as set forth in claim 9 wherein said means for energizing said indicator comprises a timer electrically connected between a source of electric current for the vehicle and said indicator for supplying electric current to said indicator for the predetermined period of time.

11. An apparatus as set forth in claim 10 wherein said means for energizing said indicator comprises power-up circuitry for supplying electric current to said timer in response to the vehicle event.

12. An apparatus as set forth in claim 9 wherein said means responsive to a vehicle event comprises a door switch of the vehicle.

13. An apparatus as set forth in claim 9 wherein said means responsive to a vehicle event comprises a remote keyless entry receiver of the vehicle.

14. An apparatus as set forth in claim 9 wherein said means responsive to a vehicle event comprises a burglar alarm system of the vehicle.

15. An apparatus as set forth in claim 9 wherein the predetermined period of time is selected to be long enough to enable a driver of the vehicle to enter the vehicle and to operate said disable switch and to turn on the vehicle ignition.

16. An apparatus as set forth in claim 9 wherein said disable switch is located on the vehicle instrument panel.

* * * * *